United States Patent
Kang et al.

(10) Patent No.: US 9,652,609 B2
(45) Date of Patent: *May 16, 2017

(54) ENTRY/EXIT ARCHITECTURE FOR PROTECTED DEVICE MODULES

(71) Applicant: Intel Corporation, Santa Clara, CA (US)

(72) Inventors: Xiaozhu Kang, Fremont, CA (US); Alpa T. Narendra Trivedi, Hillsboro, OR (US); Siddhartha Chhabra, Hillsboro, OR (US); Prashant Dewan, Hillsboro, OR (US); Uday R. Savagaonkar, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/739,133

(22) Filed: Jun. 15, 2015

(65) Prior Publication Data

US 2015/0278514 A1      Oct. 1, 2015

Related U.S. Application Data

(63) Continuation of application No. 13/891,255, filed on May 10, 2013, now Pat. No. 9,087,202.

(51) Int. Cl.
*G06F 21/53* (2013.01)
*G06F 21/60* (2013.01)
(Continued)

(52) U.S. Cl.
CPC .............. *G06F 21/53* (2013.01); *G06F 21/50* (2013.01); *G06F 21/60* (2013.01); *G06F 21/78* (2013.01);
(Continued)

(58) Field of Classification Search
CPC .......... G06F 21/53; G06F 21/78; G06F 21/50; G06F 21/60; G06F 2221/034; G06F 12/14

See application file for complete search history.

(56) References Cited

U.S. PATENT DOCUMENTS 6,073,157 A * 6/2000 Horiguchi ............. G06F 9/4843
                                                          718/100
7,388,581 B1 * 6/2008 Diard ........................ G06T 1/20
                                                          345/421

(Continued)

FOREIGN PATENT DOCUMENTS

WO      2011078855 A9      6/2011

OTHER PUBLICATIONS

U.S. Appl. No. 13/690,401, filed Nov. 30, 2012 entitled "Secure Environment for Graphics Processing Units"—28 pages.

(Continued)

*Primary Examiner* — Joseph P Hirl
*Assistant Examiner* — J. Brant Murphy
(74) *Attorney, Agent, or Firm* — Trop Pruner & Hu, P.C.

(57) ABSTRACT

The entry/exit architecture may be a critical component of a protection framework using a secure enclaves-like trust framework for coprocessors. The entry/exit architecture describes steps that may be used to switch securely into a trusted execution environment (entry architecture) and out of the trusted execution environment (exit architecture), at the same time preventing any secure information from leaking to an untrusted environment.

28 Claims, 10 Drawing Sheets

(51) Int. Cl.
*G06F 21/78* (2013.01)
*G06F 21/50* (2013.01)
*G06F 12/14* (2006.01)

(52) U.S. Cl.
CPC ........ *G06F 12/14* (2013.01); *G06F 2221/034* (2013.01)

(56) References Cited

U.S. PATENT DOCUMENTS

| | | | | |
|---|---|---|---|---|
| 8,650,653 | B2* | 2/2014 | Poornachandran | G06F 21/84 709/224 |
| 2004/0109563 | A1* | 6/2004 | Evans | G11B 20/00086 380/227 |
| 2005/0022196 | A1* | 1/2005 | Davis | G06F 9/3851 718/100 |
| 2007/0103476 | A1* | 5/2007 | Huang | G06T 15/005 345/522 |
| 2008/0082772 | A1* | 4/2008 | Savagaonkar | G06F 12/145 711/163 |
| 2009/0172331 | A1* | 7/2009 | Vembu | G06F 21/10 711/163 |
| 2011/0239211 | A1* | 9/2011 | Kim | G06F 21/572 717/178 |
| 2012/0163589 | A1* | 6/2012 | Johnson | G06F 21/10 380/30 |
| 2013/0044084 | A1* | 2/2013 | Hendry | G06F 21/84 345/204 |
| 2013/0191817 | A1* | 7/2013 | Vorbach | G06F 8/4441 717/150 |
| 2013/0238938 | A1* | 9/2013 | Baliga | G06F 11/3632 714/38.1 |
| 2014/0089617 | A1* | 3/2014 | Polzin | G06F 12/14 711/163 |

OTHER PUBLICATIONS

U.S. Appl. No. 13/832,435, filed Mar. 15, 2013 entitled "Secure Rendering of Display Surfaces"—33 pages.

* cited by examiner

ENTRY/EXIT ARCHITECTURE FOR PROTECTED DEVICE MODULES

CROSS-REFERENCE TO RELATED APPLICATIONS

This application is a continuation of U.S. patent application Ser. No. 13/891,255, filed on May 10, 2013.

BACKGROUND

This relates generally to coprocessors including processor graphics sometimes called graphics processors or graphics processing units.

Processor graphics are increasingly being exposed to workloads which require some degree of security. Security sensitive workloads on processor graphics have relied on the operating system to provide the necessary security. However, the increasing number of malware attacks suggest that these solutions are not meeting the security requirements for a number of workloads.

Examples of workloads that may need trust computation frameworks on graphics processing units include bank transactions where a browser offloads part of a transaction to a graphics engine, antivirus engines where part of the pattern matching is offloaded to graphics engine, and medical imaging. In addition, many non-security workloads need added security, such as computer aided design, and graphical and other workloads need unhampered execution in the presence of malware. Also, security sensitive workloads are being offloaded to processor graphics due to the power, efficiency and performance improvements achieved by graphics processors. Examples may include cryptographic functions, pattern matching primitives, and face detection algorithms as well as certain workloads for mining, oil refineries, financial calculations and other calculations involving money.

Security sensitive workloads may need a trust framework on processor graphics that not only enforces the correctness of execution of the workload but also enables strict access control of the graphics assets to only authorized entities.

BRIEF DESCRIPTION OF THE DRAWINGS

Some embodiments are described with respect to the following figures.

DETAILED DESCRIPTION

The entry/exit architecture may be a critical component of a protection framework using a secure enclaves-like trust framework for coprocessors. The entry/exit architecture describes steps that may be used to switch securely into a trusted execution environment (entry architecture) and out of the trusted execution environment (exit architecture), at the same time preventing any secure information from leaking to an untrusted environment.

In accordance with some embodiments, a protected execution environment may be defined for a coprocessor. This framework not only protects the workloads from malware running on the coprocessor but also protects those workloads from malware running on the central processing unit. In addition, the trust framework may facilitate proof of secure execution by measuring the code and data structures used to execute the workload. If a part of the trusted computing base of this framework or protected execution environment is compromised, that part can be patched remotely and the patching can be proven remotely throughout attestation in some embodiments.

Figure 1:
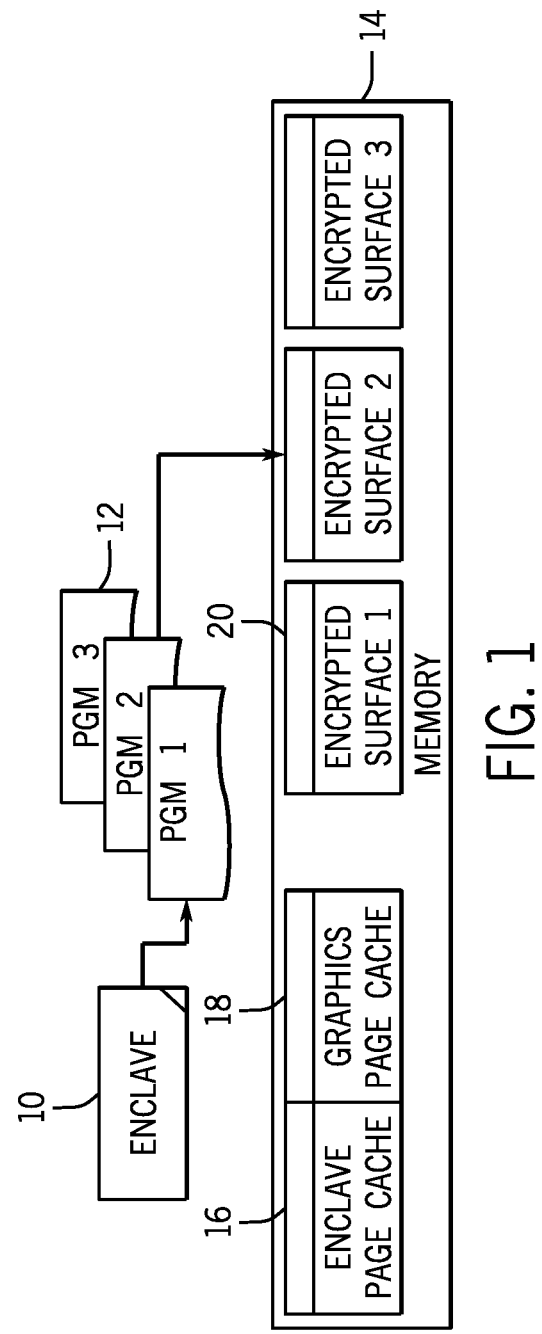
FIG. 1 is a pictorial diagram of one embodiment of the present invention.

Referring to FIG. 1, protected graphics modules 12 (i.e. PGM1, PGM2 and PGM3), resident on processor graphics, contain code, data, and states needed for correct execution of a workload in the processor graphics. Similar to non-secure graphics workloads, the protected graphics module is created by software running on the central processing unit (CPU) by special CPU instructions. However, the protected graphics module can only be executed on the graphics processing unit in some embodiments. It may have the ability to assert correctness of execution to remote parties. In one embodiment, the module relies on the secure enclaves infrastructure to provide this assertion. See Patent Cooperation Treaty application number WO/2010/057065, published on 20 May 2010.

In secure enclaves, a protected execution environment is built inside an application. An operating system constructs an enclave using a set of privileged instructions. Once the enclave is constructed, the application can enter and exit the enclave using a set of unprivileged instructions. An enclave executes in a physically protected area of memory called the enclave page cache. The hardware ensures that memory pages belonging to the enclave page cache can only be accessed by the enclave that owns those pages, and also ensures that malicious unprivileged software cannot redirect memory accesses originating from an enclave in an unexpected fashion. Software executing inside an enclave can prove that the enclave was constructed correctly by the operating system via hardware based attestation.

The graphics page cache 18 in the memory 14 holds code and data used by the protected graphics modules (PGMs) 12. In one embodiment this section of memory is implemented in the system dynamic random access memory (DRAM) and is cryptographically protected by a memory encryption engine. In yet another embodiment, this section of memory is implemented inside the processor package as static random access memory (SRAM) or embedded DRAM (eDRAM). This section of memory may be managed by the operating system graphics driver using a set of privileged CPU instructions. It may not be accessible to either of them for purposes of read or write or execute. The modules 12 reside inside the graphics page cache 18. In one embodiment, the graphics page cache may be combined with an enclave page cache 16.

The enclave 10 is responsible for creating and initializing the modules 12. Once a module is created and initialized by the enclave 10, various hardware engines on the processor graphics can enter the module 12 using specific entry points. Additionally, after module initiation, the enclave itself can carry out portions of the secure computation, and can communicate with the module via the graphics page cache 18. In this regard, the enclave 10 is the central processing unit (CPU) counterpart of the modules 12 and it can have a one-to-many relationship with the modules 12.

The enclave 10 and modules 12 are both optional embodiments from the perspective of a developer. The application developer may decide whether an application needs a level of security provided by the combination of enclave and protected graphics module 12 in some embodiments.

Thus, within the memory, may be an enclave page cache 16, graphics page cache 18 including the modules 12 and the enclave 10 and one or more encrypted surfaces 20 to hold necessary data and/or instructions.

Figure 2:
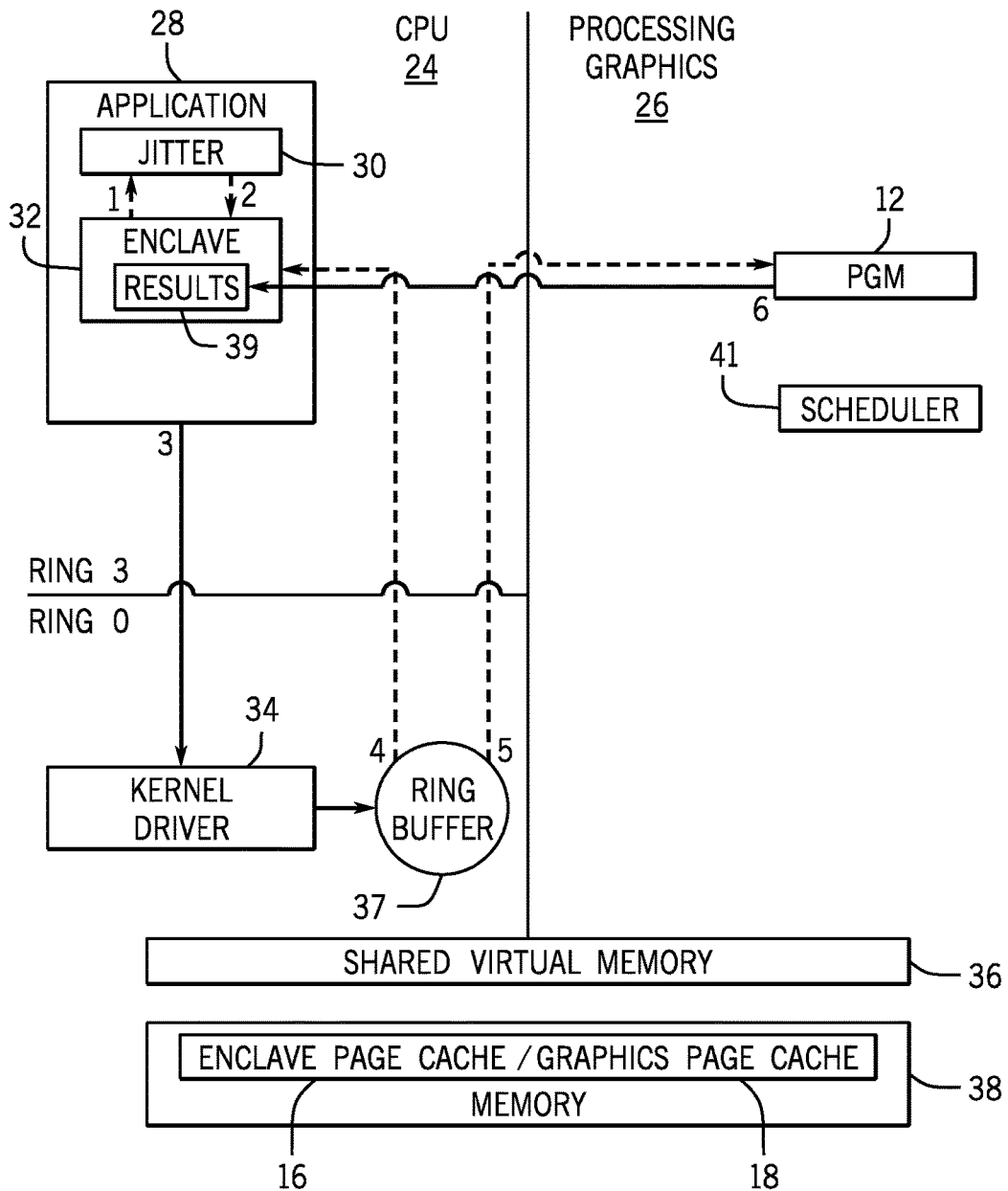
FIG. 2 is a diagram of the life cycle of a protected graphics module in accordance with one embodiment.

The processor graphics 26, shown in FIG. 2, includes the protected graphics module 12 while the application 28 is resident within the CPU 24. The CPU 24 may include a just-in-time execution engine (jitter) 30 and the enclave 32. It may also support a kernel driver 34. Shared virtual memory 36 may be shared between the central processing unit 24 and the processor graphics 26. Shared system memory 38 may store the enclave page cache 16 and graphics page cache 18.

Initially, the application 28 is launched on the CPU 24. This application is typically a ring three application launched in a process of its own. The application creates an enclave 32. The pages allocated for the enclave are allocated off of the enclave page cache 16. The enclave may contain metadata and metacode to create the protected graphics modules 12. The enclave also contains the jitter 30 for converting the module metacode from a high level language to the binary format that can be recognized by the graphics hardware. The enclave also contains metadata and metacode to create the modules 12.

To create a module 12, the enclave loads metacode and metadata from the graphics workload and measures or verifies the workload using appropriate crypto operations. This is indicated by the arrows 1 and 2 in FIG. 2. Then the enclave sets up the processor graphics state and the data structures needed for the execution of the module 12 in the graphics page cache 18.

The invocation of the module proceeds as follows. The enclave requests through the application, that the kernel mode graphics driver 34 execute the module by providing it relevant metadata. This is indicated by the arrow 3 in FIG. 2. The kernel mode graphics driver 34 (ring zero) takes the metadata and sets up the graphics engine state as per the metadata (arrow 4). The kernel graphics driver then points the processor graphics to the entry point of the module 12 via ring buffer 37 as indicated by the arrow 5. The kernel mode graphics driver maps the graphics page cache into the graphics address space by appropriately modifying the shared virtual memory 36 tables.

The processor graphics 26 executes the module 12 as indicated by the arrow 6. The graphics scheduler 41, within the processor graphics 26, informs the driver 34, which then closes the access to the graphics page cache provided for execution of the module 12. When the module 12 is scheduled for execution again, the graphics driver provides the graphics page cache access to the module and the module is executed. After the module completes its execution, it writes its results 39 of the execution to the output address inside the graphics page cache as indicated by the arrow 6. As specified in the metadata during the creation of the module 12, the fronting enclave subsequently reads the output and provides it to the central processing unit code executing inside the enclave.

In accordance with one embodiment, the module 12 may have a well-defined format in memory and the format is used to measure the unique components of the module and bind them to the results. The microcode measures the module at the time of execution by the enclave and provides a cryptographically signed measurement to the enclave. The enclave includes the measurement of the module and the measurement of the enclave and the combined data is used for attestation using the enclave attestation protocol.

In another embodiment, the module has an arbitrary format and is only understood by a loader inside the enclave. The enclave uses public key cryptography to verify the source of the module blob. The fact that the enclave enforces public verification is implicitly attested to by the enclave's measurement.

Even though the embodiment above pertains to processor graphics, these procedures can be applied to any coprocessor including crypto accelerators integrated on the same chip as the central processing unit. As used herein, a coprocessor is any second processor including an accelerator provided in the same device as a central processing unit or digital signal processor.

The concept of a protected graphics module can be generalized to an enclave-device-module (EDW) where the enclave-device-module represents a enclave protected portion of the workload running on an input output accelerator device. Methods to enter and exit an EDW are described hereinafter. The entry/exit architecture forms a component of a protection framework that is worth the steps necessary to switch securely into a trusted execution environment (entry architecture) and out of a trusted execution environment (exit architecture), while at the same time preventing secure information from leaking to an untrusted environment.

An EDW includes code, data, and state needed to insure secure execution of the graphics workload. Examples of EDW contents include batch buffers, execution unit kernels, register states, and data used by those batch buffers or kernels. The concept of an EDW can be generalized for general input/output accelerator devices.

The execution of secure workloads may be implemented by entering the EDW only through a well-defined entry structure called a device thread control structure (DTCS) that is specific to a particular input/out accelerator device. Compliant devices can be devices with command execution capabilities such as graphics processing units and devices with Memory Management Input Output (MMIO) capabilities alone.

Two commands (MI_EENTER, MI_EEXIT) may be added to enable an EDW entry and exit. In a processor graphics engine, a subset of commands is privileged. These commands may be issued only from a privileged batch buffer or directly from a ring buffer in one embodiment.

EDW commands may be unprivileged commands that may be appear in a batch buffer based on the typical usage model. For example a batch buffer may be initiated from a ring buffer and the batch buffer contains the MI_EENTER command that initiates the EDW batch buffer.

In some embodiments, the EDW commands are unprivileged. Making them privileged may not add more security and making them unprivileged saves the overhead of a ring switch/system call. Moreover the operating system may not need to know whether the context is secure enclaves related or not. It may also simplify the driver changes, as kernel mode drivers just need to take the command buffer from the user-mode driver without any command patching.

A processor graphics command streamer enters EDW when it executes a new secure enclave command called MI_EENTER. The command takes a pointer to the DTCS belonging to the EDW. After executing this command, a command streamer enters the EDW by marking the DTCS as "busy" and starts fetching commands from a batch buffer inside the EDW whose pointer is located in the DTCS.

When a command streamer enters an EDW, it puts the entire engine that it represents inside the EDW. For example, when the render command streamer executes MI_EENTER, the entire render/media pipelines, including all the execution units, enter the EDW. The command streamer exits the EDW by executing a command called MI_EEXIT on a context switch-out due to preemption.

Also, an arbitration state called "ENCLAVE" may be added for the command streamer or functional unit block command streamer arbiter (CSARB). The command streamer arbiter is the main arbitration unit of each command streamer. Its primary purpose is to define what state the command streamer is currently in. Also on a state transition, the command streamer arbiter configures the control around structures and it ensures all other command streamer functional unit blocks are ready for the transition. The existing arbitration states are: ring, batch, context switch, and work-around batch. The EDW state is set on MI_EENTER, and reset on MI_EEXIT, bringing the command streamer back to the batch buffer state. The opposite states may also be used.

A DTCS is used by a secure enclaves workload to enter the EDW for the first time in synchronous entry and reenter the EDW for the Nth time in asynchronous entry through execution of MI_EENTER command. The address to the DTCS is called the Device Thread Control Structure Address (DTCSA), which may be part of the MI_EENTER and the format of the command may allow it to be parsed by the command streamer.

Figure 3:
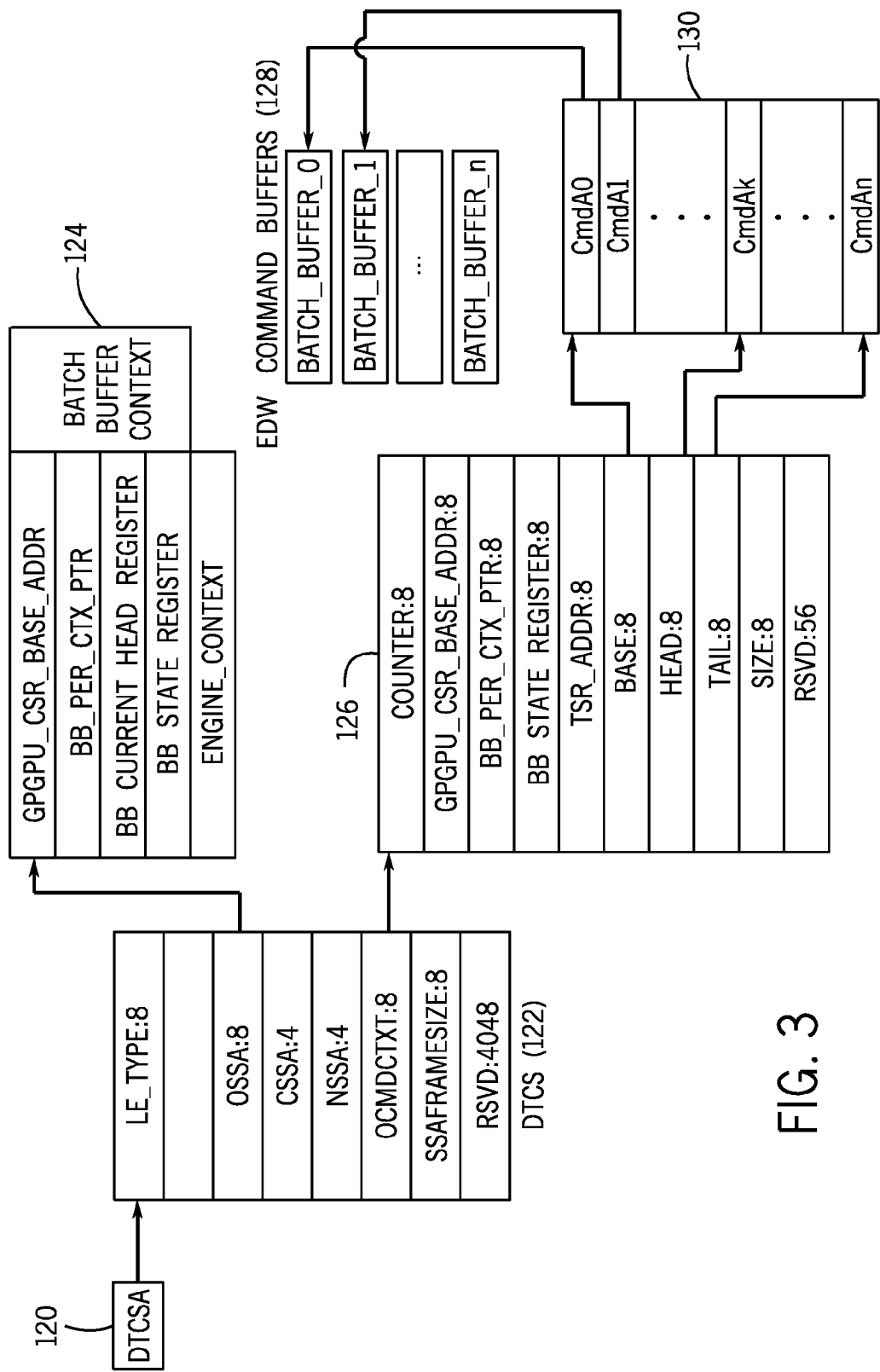
FIG. 3 is a flow chart for one embodiment.

The detailed data structure of the DTCS is engine dependent. FIG. 3 shows the details of the device thread control structure (DTCS) 122, the entry data structure for EDW, and the other data structures pointed by it, according to one embodiment. The DTCS receives a DTCSA 120.

LE_TYPE defines the logic engine type of the logical engine that can use the DTCS. OSSA contains the offset of the logical-engine state save area from the enclave base, used to save the intermediate logic logical-engine state on asynchronous exit. The design of the entry structure as a whole may allow greater efficiency since modifying the DTCS is potentially expensive. An enclave can use a single DTCS multiple times for execution of multiple EDWs, and enclave-CPU-workload is still able to change the device workload for the same DTCS during the execution of enclave-device-workloads.

OSSA.ENGINE_CONTEXT in batch buffer context 124 in FIG. 3 contains the same fields as the logical engine context for a given logical engine. It stores per-logical-engine data on a context switch by the command streamer. The command streamer restores the logical engine data as part of context restore. Engine context may not be software programmable and may not be modified by the enclave software in one embodiment. If the enclave software modifies the engine context, the behavior may be undefined.

NSSA is a number of state save areas (SSAs). SSAs are memory areas to save the intermediate state of the engine (workload) status in case it is scheduled out. They are the memory area to save an intermediate image of workload/engine. The field may be set to one for some graphics processors. CSSA is the current SSA frame number. It is an index into the array of frames addressed by OSSA. It may be initialized to zero.

SSAFRAMESIZE defines the size of an SSA frame. It may not be needed for functionality but eases the software so that software allocates sufficient SSA before entering the enclave. Otherwise it would just crash on a context switch because the hardware will not know where to save the context. Some reserved (RSVD) bits may also be provided.

OCMDCTXT contains the offset for the command buffer context with the initial state of commands of the enclave-device-workload. OCMDCTXT.COUNTER, in block 126, specifies how many times the DTCS can be used by the logic engines to enter the EDW. The value of the counter may be decremented on each synchronous exit. OCMDCTXT.GPG-PU_CSR_BASE_ADDR in blocks 124, 126 points to a memory area that stores the execution unit and the level 3 cache on context switch. The state is protected for context switches inside the enclave-device-workload. Enclave-CPU-workload initializes it to point to a memory location inside the enclave. The engine loads this address on MI_EENTER and saves the previous address in the logical engine context. OCMDCTXT.BB_STATEREGISTER (blocks 124, 126) stores the attributes of an EDW batch buffer. BB_PER_CTX_PTR contains the address of the handler that is executed on context switch used for software interaction with context or store and ring context execution. OCMDCTXT.TSR_ADDR (block 126) contains the address of the enclave system routine (TSR).

The following four fields define a queue to store the addresses of command buffers submitted by an application or user-mode driver (UMD) for the same EDW in sequence. Both the queue (block 120) and command buffers 128 are inside the secure enclave. OCMDCTXT.BASE (block 126) points to a 4K page for the queue in one embodiment. OCMDCTXT.HEAD (block 122) points to the address of the current command buffer in the queue. After hardware execute, each command buffer's command streamer updates HEAD=HEAD plus size of (AddressSize) the HEAD to point to the address of the next command buffer sequenced by the queue. It continues doing that until HEAD==TAIL. OCMDCTXT.TAIL points to the address of the last command buffer in the queue. When the enclave CPU workload allocates the 4K page for the queue, it sets the HEAD and TAIL to BASE. Each time the UMD submits one command buffer to the kernel mode driver (KMD), it adds its address to the queue and increments TAIL by TAIL=TAIL+sizeof (AddressSize). OCMDCTXT.SIZE contains the size of the queue.

In an EDW enter, the processor graphics executes MI_EENTER on synchronous entry or asynchronous entry. The MI_EENTER command takes a DTCSA as an input and performs the operation shown in FIG. 4 in one embodiment.

Figure 4:
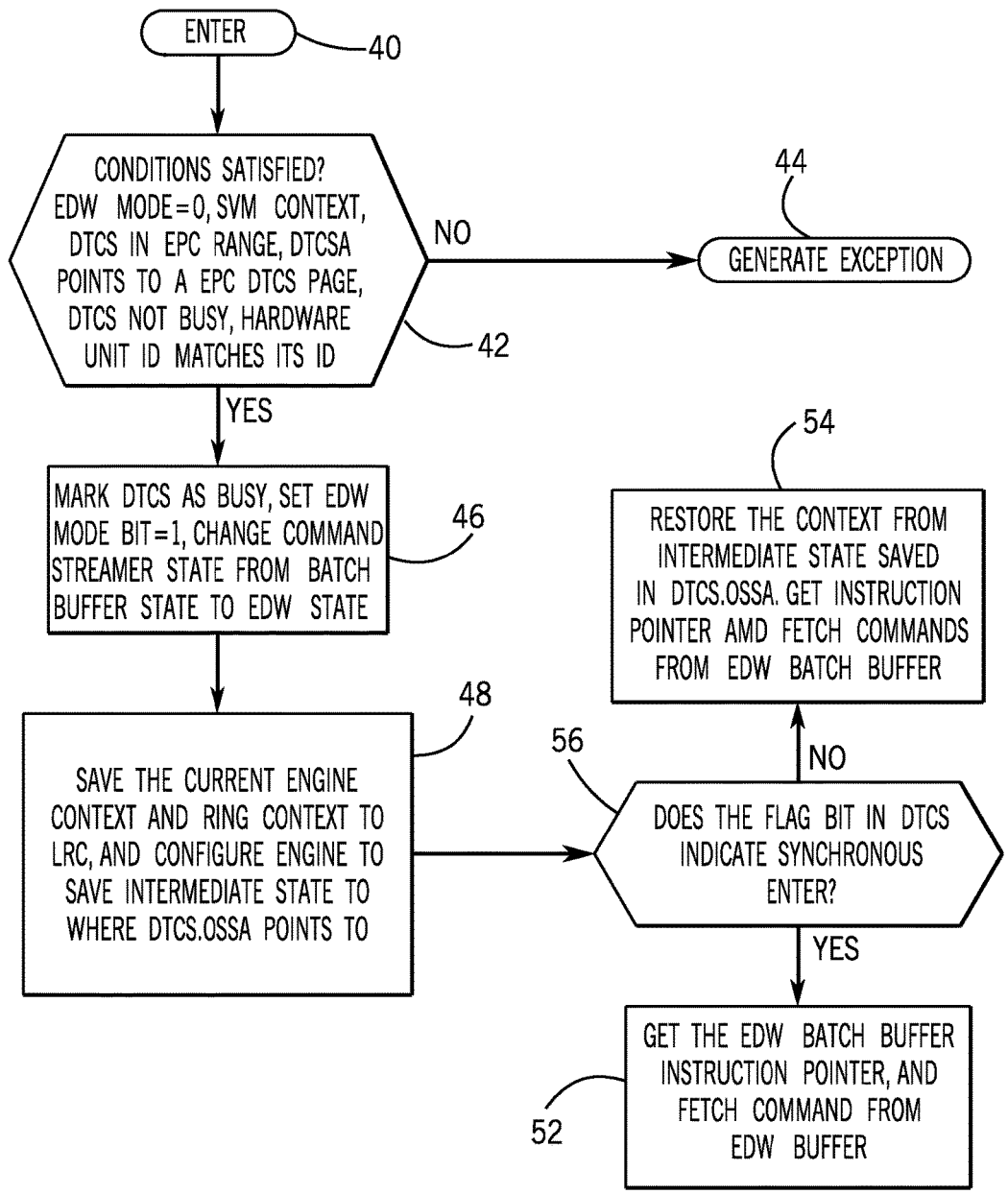
FIG. 4 is a flow chart for another embodiment.

Referring next to FIG. 4, a sequence depicted there may be implemented in software, firmware and/or hardware. In software and firmware embodiments it may be implemented by computer executed instructions stored in one or more non-transitory computer readable media such as magnetic, optical or semiconductor storages.

The enter sequence 40 begins by checking whether certain conditions are satisfied in block 42. One check is whether the EDW mode is set to zero. Other checks include whether the shared virtual memory context exists, whether the DTCS is in the enclave page cache range, whether the DTCSA points to an enclave page cache processor DTCS page, whether the DTCS is not busy, and whether the hardware unit identifier matches its own identifier. If not an exception is generated at block 44.

If so, the DTCS is marked as busy at block 46. The EDW mode bit is changed to one and the command streamer state is changed from batch buffer state to EDW state.

Then, in block 48, the current engine context is saved and the ring context is set to logical (i.e. LRC). The engine is configured to save the intermediate state to where DTCS.OSSA points.

A check at diamond 56 determines whether a flag bit in the DTCS indicates synchronous entry. If not, the engine context and batch buffer context are restored in block 54 from the intermediate state saved in DTCS.OSSA. An instruction pointer is obtained and commands are fetched from the EDW batch buffer, indicated in block 54. If a flag does indicate synchronous entry, then the EDW batch buffer instruction pointer is obtained and the command is fetched from the EDW buffer, as indicated in block 52.

For the protected device module exit, there is a general correspondence with the protected device module entry. There are two ways of exiting a protected device module, a synchronous exit when finishing a protected device module via the command MI_EEXIT and an asynchronous exit due to preemption. A "preemption" occurs when the context (LRC) gets scheduled out while executing inside a protected device module.

For synchronous exit, a MI_EEXIT command may only be executed inside an EDW batch buffer when the engine is in EDW mode. It is used to leave an EDW initiated by a MI_EENTER command and performs the operations as indicated in FIG. 5.

Figure 5:
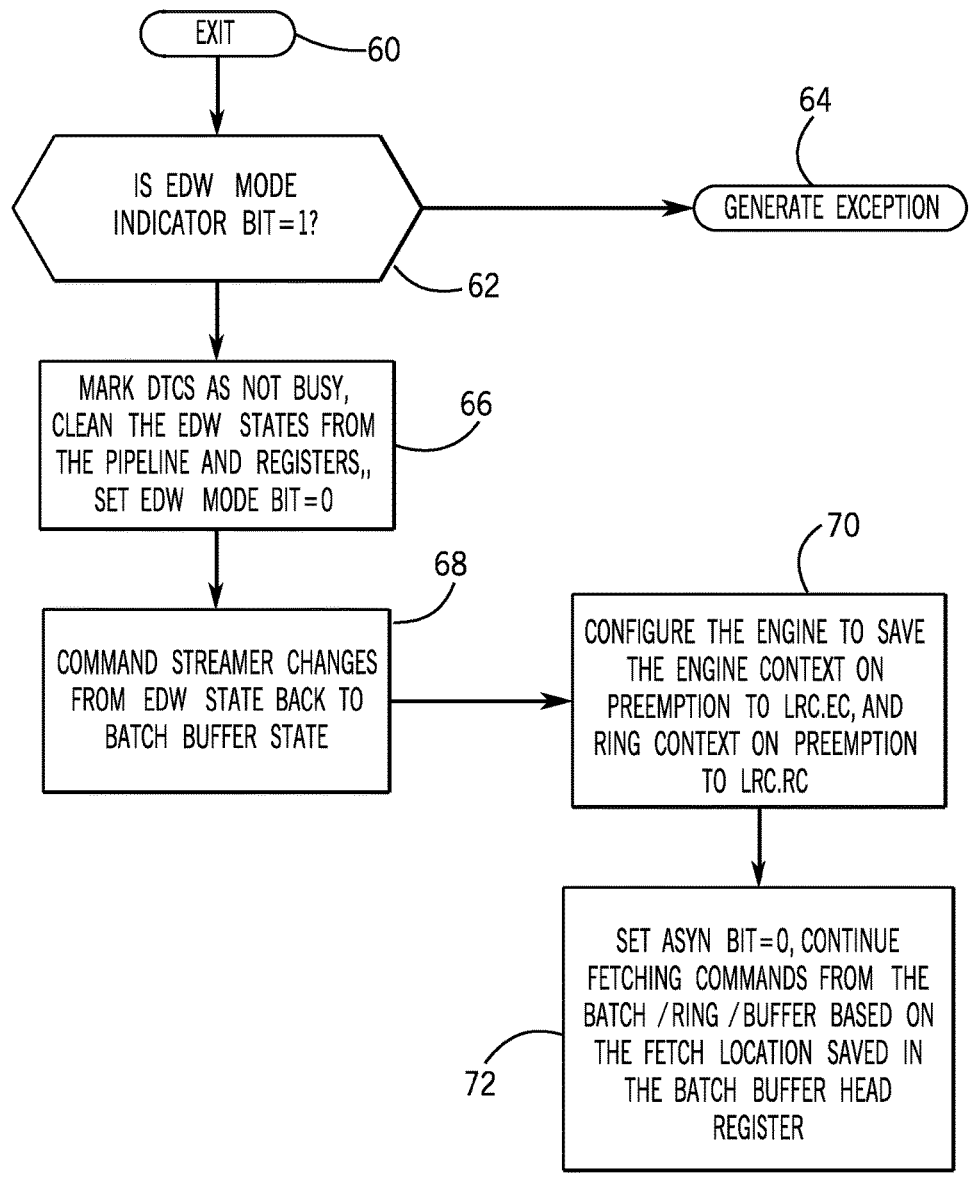
FIG. 5 is a flow chart for still another embodiment.

Referring to FIG. 5, an exit sequence depicted there may be implemented in software, firmware and/or hardware. In software and firmware embodiments it may be implemented by computer executed instructions stored in one or more non-transitory computer readable media such as magnetic, optical or semiconductor storages.

The sequence 60 begins by checking if an EDW mode indicator bit is set to one (diamond 62). If not, an exception is generated at 64. If so, the DTCS is marked as not busy, as indicated in block 66. The EDW states are cleaned from the pipeline and registers and the EDW mode bit is set to zero.

Then the command streamer changes from EDW state back to batch buffer state, as indicated in block 68. The engine is configured to save the engine context on preemption to LRC.EC. The ring context is saved on preemption to LRC.RC, as indicated in block 70. The asynchronous bit is set equal to zero and commands are fetched from the batch/ring buffer based on the fetch location saved in a batch buffer head register as indicated in block 72.

For asynchronous exit, the command streamer saves the engine context to DTCS.OSSA.EC, the batch buffer context to PDES.BBC, the ring context to LRC.RC and sets asynchronous indicator flag bit equal to one. There can also be scenarios with synchronous entry and exit and asynchronous entry with asynchronous exit.

Figure 6:
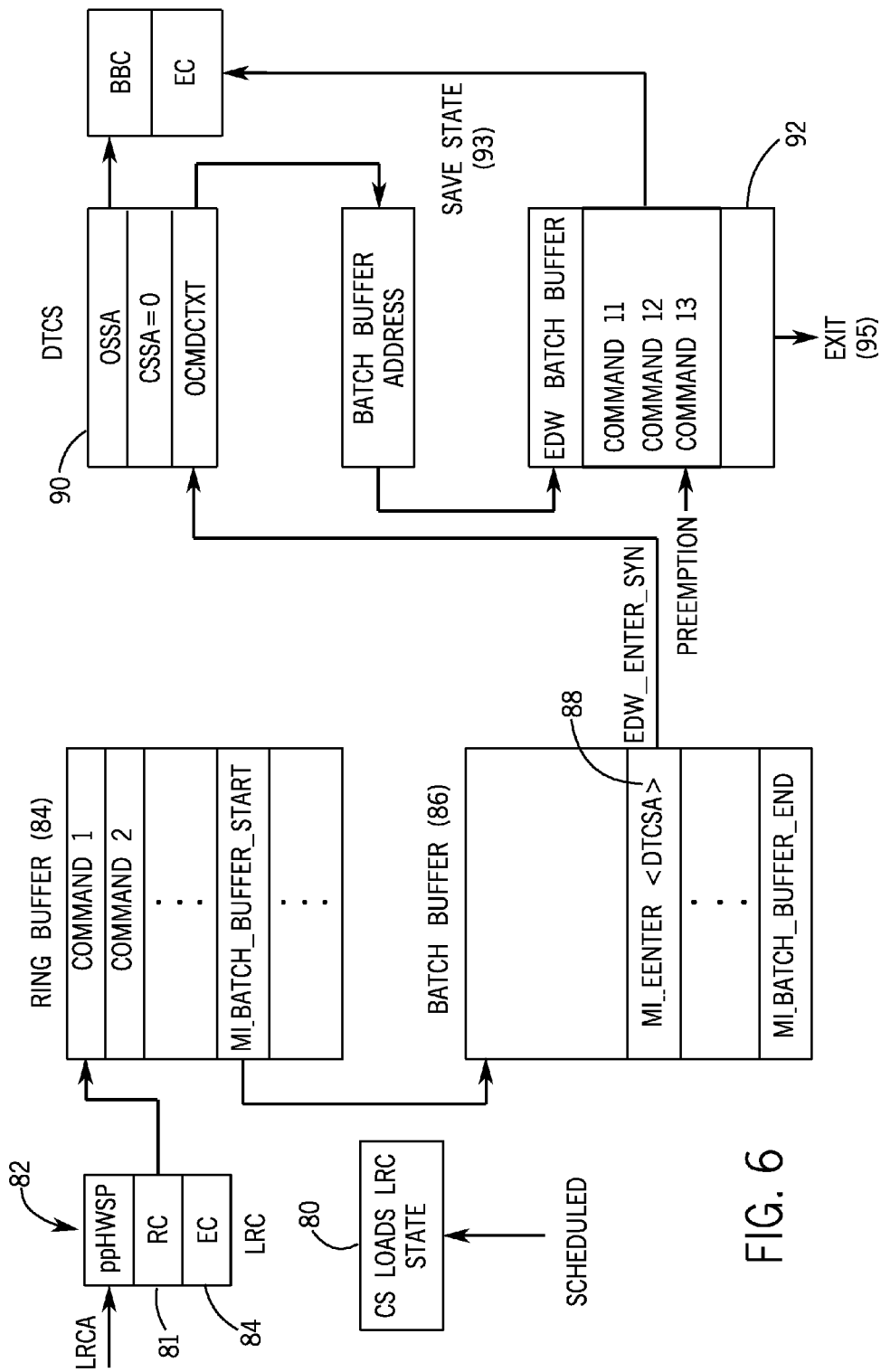
FIG. 6 is a schematic depiction of a first embodiment.

Referring to FIG. 6, an EDW synchronous entry via MI_EENTER and asynchronous exit is illustrated.

In FIG. 6, when a context gets scheduled, the command streamer loads the LRC 82 state (RC 81 or EC 84) as indicated in block 80. A command sequence in the ring buffer 84 gets parsed and executed sequentially. On execution of the command MI_BATCH_BUFFER_START, a batch buffer 86 gets initiated. In the batch buffer, the MI_EENTER command initiates a synchronous entry to EDW.

The command MI_EENTER takes the DTCSA 88 as an input to DTCS 90 and takes the execution flow to the first batch buffer 92 for the EDW. Then the EDW batch buffer 92 is executed. In the case where the context gets preempted and switched out, an intermediate state 93 is saved to where DTCS.OSSA points to. An asynchronous control flow exit is executed (95).

Figure 7:
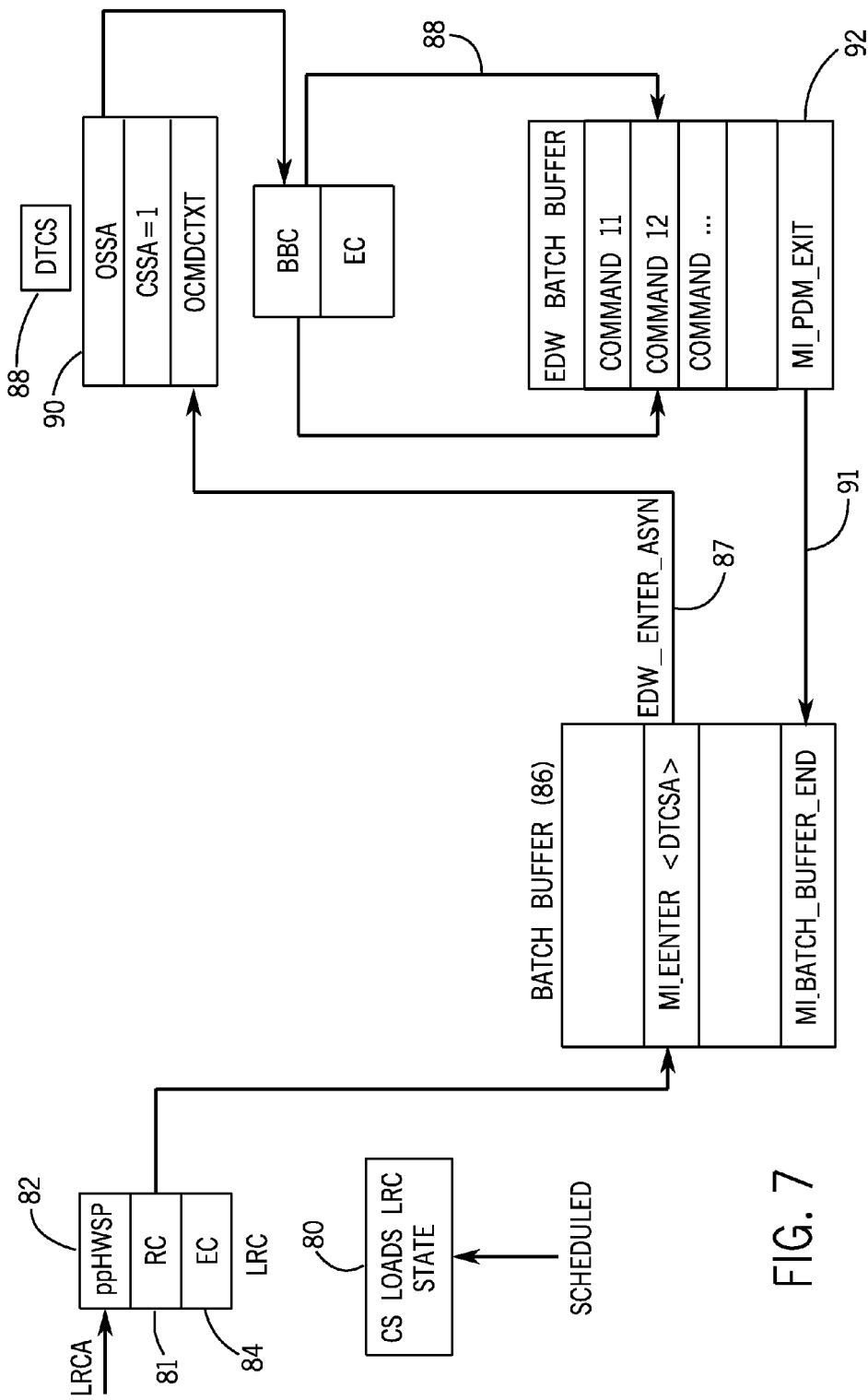
FIG. 7 is a schematic depiction of a second embodiment.

Referring next to FIG. 7, showing an asynchronous entry and synchronous exit, when a context gets scheduled, the command streamer loads the saved LRC state, as indicated at 80. The command parser executes from the place where the asynchronous exit happens. In the batch buffer 86, the MI_EENTER command initiates an asynchronous entry 87 to the EDW because a CSSA>O (set on its last asynchronous exit).

Then the command MI_EENTER takes a DTCS address 88 as an input (block 90) and takes the execution flow to the EDW batch buffer 92 where it got preempted. The EDW module is executed until the last command in the batch buffer 86 MI_EEXIT causes a synchronous exit 91.

For on chip devices such as a chip graphics accelerator or discrete accelerator devices that do not have an internal command streamer unit, the device can enter and exit the EDW by programming one of the memory management input output (MMIO) registers in a device memory aperture.

Figure 8:
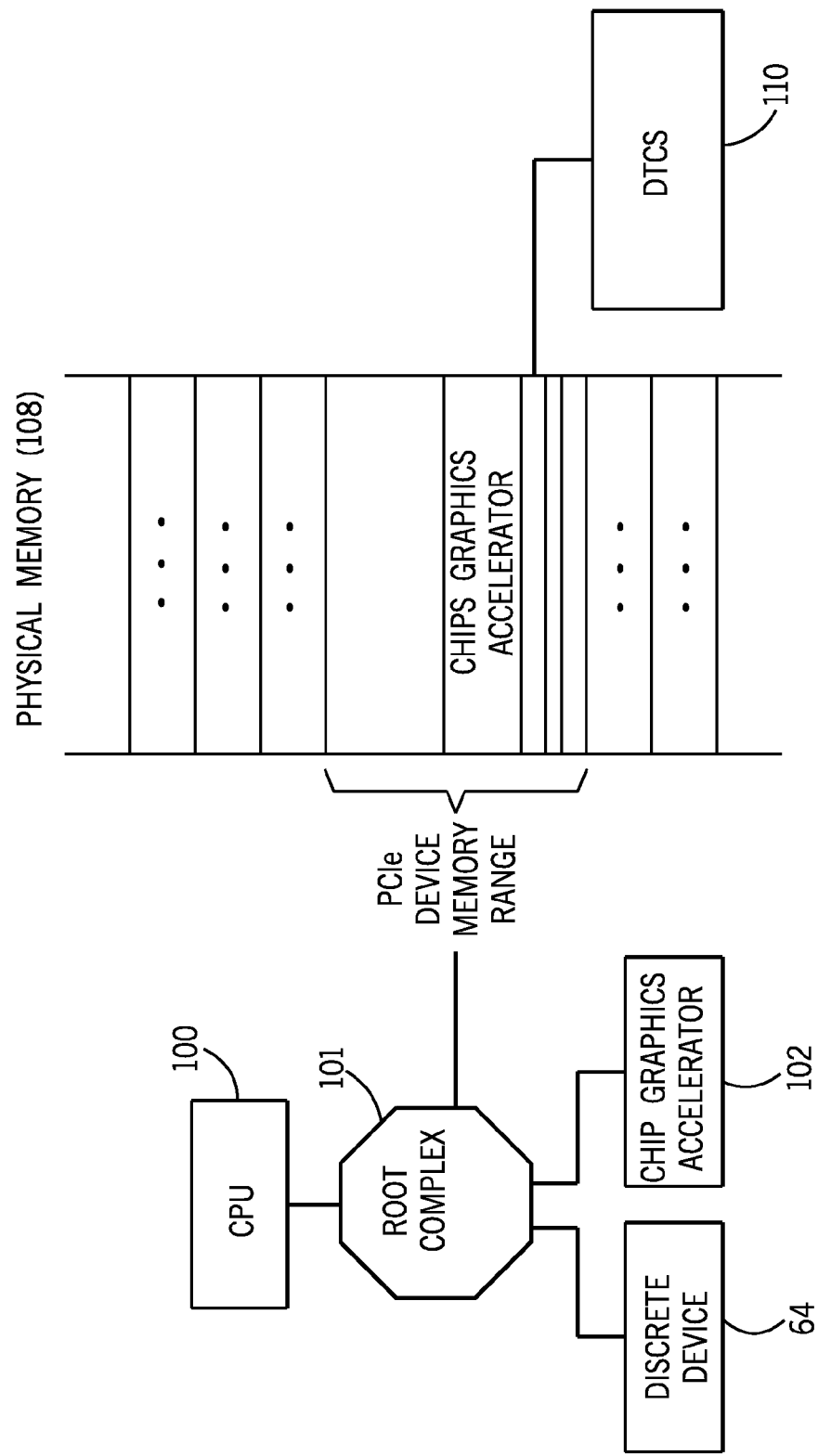
FIG. 8 is a schematic depiction for third embodiment.

The flow shown in FIG. 8 represents a flow for a device 102 to enter the EDW through an added data structure DTCS 110. A DTCS is a device specific data structure, residing in the enclave page cache, and containing both necessary and security sensitive information needed for protected device module execution.

As the entry mechanism, a device driver associated with central processing unit 100 submits a memory write to one of the registers in the MMIO space allocated by the root complex 101 also connected to a discrete device 64 for the device to program the DTCS address (DTCSA) in physical memory 108. The same register or a separate register may be used for arming or to enforce that the device will now start executing from the EDW through the DTCS.

The exit mechanism (either asynchronous or synchronous) may be device specific. However, in secure enclaves, on exiting an EDW, the device clears the state associated with the EDW before switching to execute any pending or queued contexts.

Figure 9:
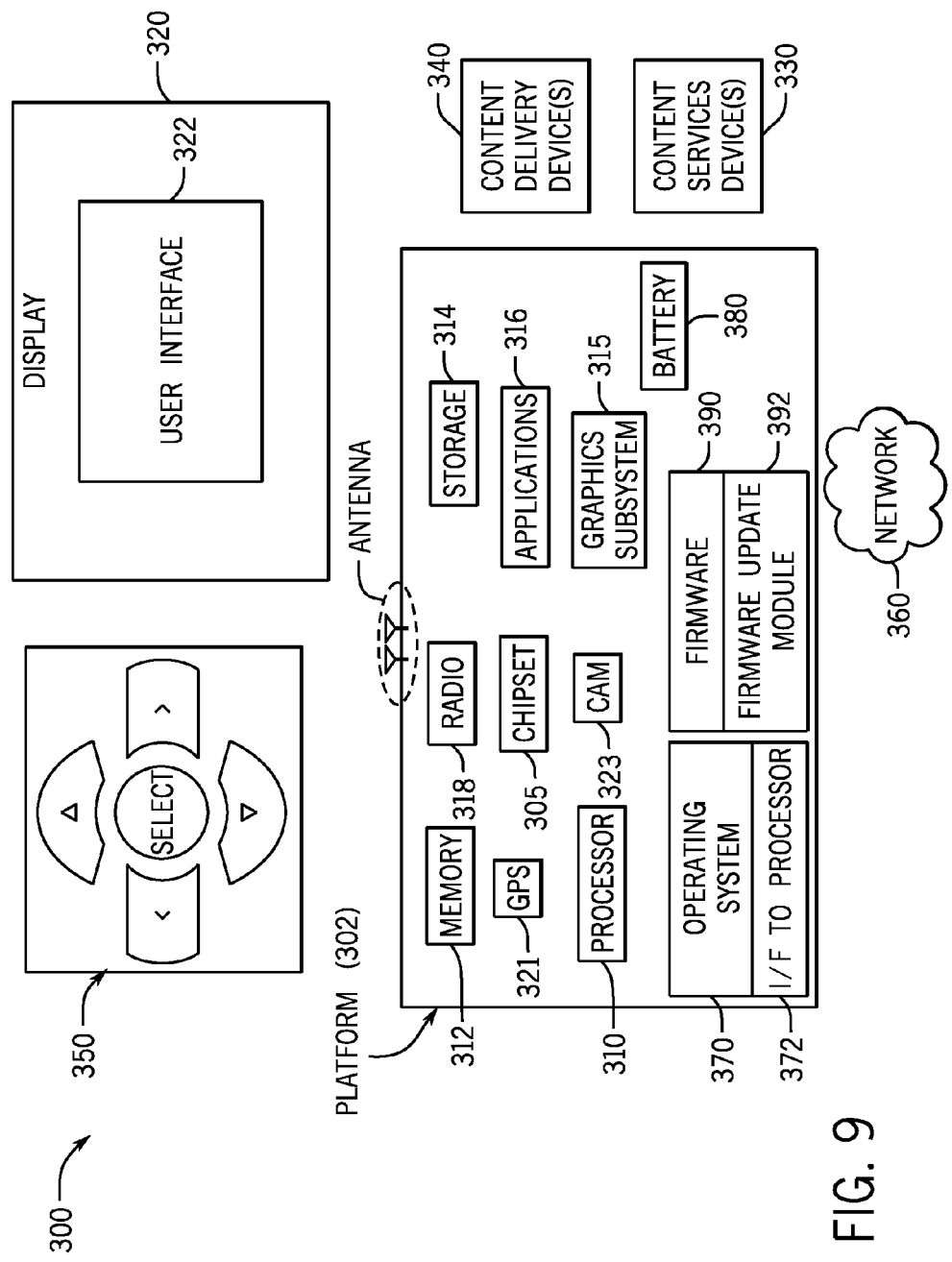
FIG. 9 is a system depiction for one embodiment.

FIG. 9 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
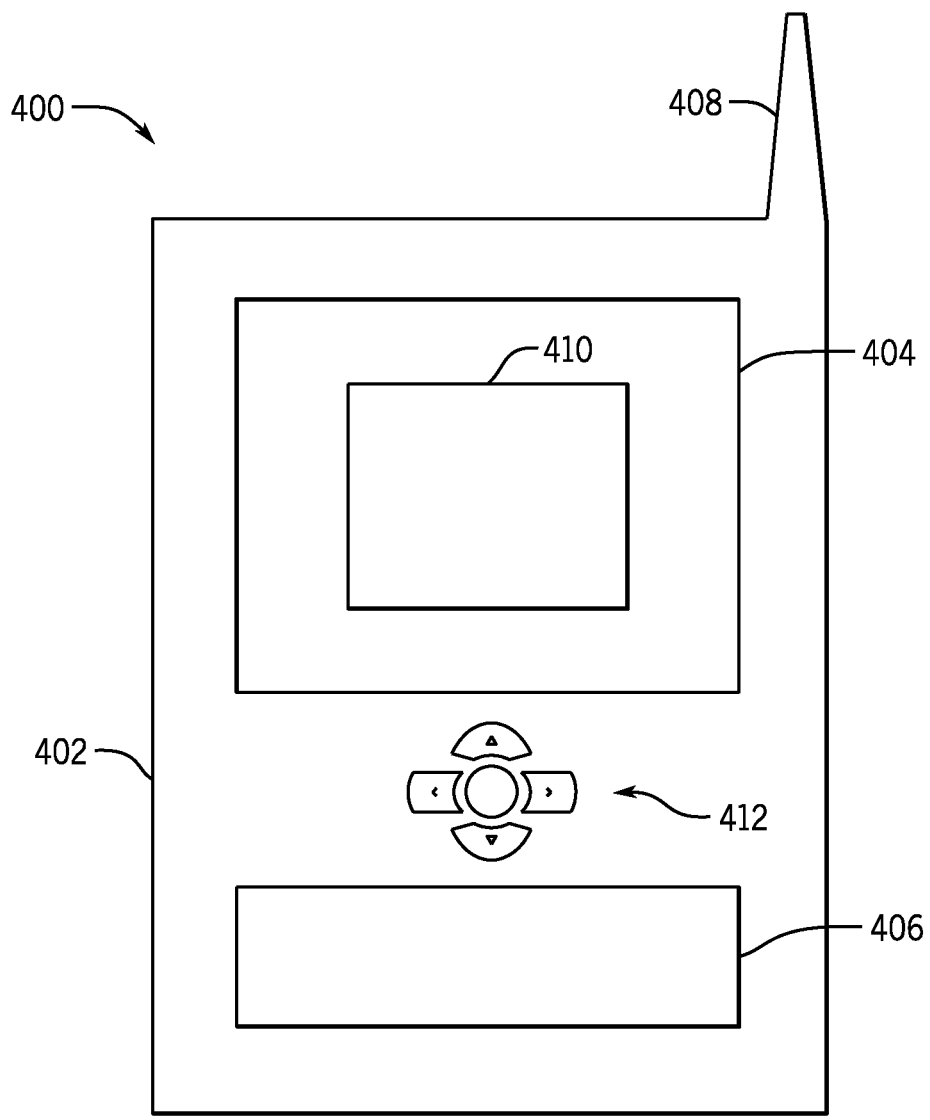
FIG. 10 is a front elevational view of one embodiment.

As described above, system 300 may be embodied in varying physical styles or form factors. FIG. 10 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 3-8 in software and/or firmware embodiments. Particularly the sequences may be implemented by one or more non-transitory storage devices storing computer implemented instructions.

As shown in FIG. 10, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations.

The following clauses and/or examples pertain to further embodiments:

One example embodiment may be a method comprising executing a command that takes a pointer to a device thread control structure belonging to an enclave-device-module, entering the enclave-device-module, and fetching commands from a buffer inside the enclave-device-module. The method may also include marking the structure as busy when the enclave-device-module is entered. The method may also include making a synchronous entry to an enclave-device-module. The method may also include making an asynchronous entry to an enclave-device-module. The method may also include making a synchronous entry on the first entry to an enclave-device-module and using an asynchronous entry thereafter. The method may also include using a flag to indicate whether to enter synchronously or asynchronously. The method may also include exiting from an enclave-device-module using a command executed inside the buffer. The method may also include using unprivileged entry commands. The method may also include using a memory write to a memory management input output device register in order to enter an enclave-device-module. The method may also include executing a command in a processor graphics to enter an enclave-device-module.

In another example embodiment one or more computer readable media storing instructions to perform a sequence comprising executing a command that points to a device thread control structure of an enclave-device-module, entering the enclave-device-module, and fetching commands from inside the enclave-device-module. The media may further store instructions including marking the structure as busy when the enclave-device-module is entered. The media may further store instructions including making a synchronous entry to an enclave-device-module. The media may further store instructions including making an asynchronous entry to an enclave-device-module. The media may further store instructions including making a synchronous entry on the first entry to an enclave-device-module and using an asynchronous entry thereafter. The media may further store instructions including using a flag to indicate whether to enter synchronously or asynchronously. The media may further store instructions including exiting from an enclave-device-module using a command executed inside a buffer. The media may further store instructions including using unprivileged entry commands. The media may further store instructions including using a memory write to a memory management input output device register in order to enter an enclave-device-module. The media may further store instructions including executing a command in a processor graphics to enter an enclave-device-module.

Another example embodiment may be an apparatus comprising a memory and a processor, coupled to said memory, to execute a command that takes a pointer to a device thread control structure belonging to an enclave-device-module, enter the enclave-device-module, and fetch commands from the memory inside the enclave-device-module. The apparatus may include said processor to mark the structure as busy when the enclave-device-module is entered. The apparatus may include said processor to make a synchronous entry to an enclave-device-module. The apparatus may include said processor to make an asynchronous entry to an enclave-device-module. The apparatus may include said processor to make a synchronous entry on the first entry to an enclave-device-module and using an asynchronous entry thereafter. The apparatus may include said processor to use a flag to indicate whether to enter synchronously or asynchronously. The apparatus may include said processor to exit from an enclave-device-module using a command executed inside the memory. The apparatus may include an operating system, a battery, including firmware and a module to update said firmware.

The graphics processing techniques described herein may be implemented in various hardware architectures. For example, graphics functionality may be integrated within a chipset. Alternatively, a discrete processor graphics may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present disclosure has been described with respect to a limited number of embodiments, those skilled in the art will appreciate numerous modifications and variations therefrom. It is intended that the appended claims cover all such modifications and variations as fall within the true spirit and scope of this application.

What is claimed is:

1. A method comprising:
   constructing a physically protected memory region for a trusted software execution environment that prevents software executing outside the memory region from having access to software and data within the memory region, for execution of a workload running on a graphics processing unit;
   executing a command that takes a pointer to a device thread control structure belonging to the protected memory region;
   entering the protected memory region; and
   fetching commands from a buffer inside the protected memory region.

2. The method of claim 1 including marking the structure as busy when the protected memory region is entered.

3. The method of claim 1 including making a synchronous entry to the protected memory region.

4. The method of claim 1 including making an asynchronous entry to the protected memory region.

5. The method of claim 1 including making a synchronous entry on the first entry to the protected memory region and using an asynchronous entry thereafter.

6. The method of claim 5 including using a flag to indicate whether to enter synchronously or asynchronously.

7. The method of claim 1 including exiting from the protected memory region using a command executed inside the buffer.

8. The method of claim 1 including using unprivileged entry commands.

9. The method of claim 1 including using a memory write to a memory management input output device register in order to enter the protected memory region.

10. The method of claim 1 including executing a command in a graphics processor to enter the protected memory region.

11. One or more non-transitory computer readable media storing instructions to perform a sequence comprising:
constructing a physically protected memory region for a trusted software execution environment that prevents software executing outside the memory region from having access to software and data within the memory region, for execution of a workload running on a graphics processing unit;
executing a command that points to a device thread control structure of the protected portion;
entering the protected memory region; and
fetching commands from inside the protected memory region.

12. The media of claim 11 including marking the structure as busy when the protected memory region is entered.

13. The media of claim 11 including making a synchronous entry to the protected memory region.

14. The media of claim 11 including making an asynchronous entry to the protected memory region.

15. The media of claim 11 including making a synchronous entry on the first entry to the protected memory region and using an asynchronous entry thereafter.

16. The media of claim 15 including using a flag to indicate whether to enter synchronously or asynchronously.

17. The media of claim 11 including exiting from the protected memory region using a command executed inside a buffer.

18. The media of claim 11 including using unprivileged entry commands.

19. The media of claim 11 including using a memory write to a memory management input output device register in order to enter the protected memory region.

20. The media of claim 11 including executing a command in a graphics processor to enter the protected memory region.

21. An apparatus comprising:
a memory; and
a coprocessor, coupled to said memory, to construct a physically protected memory region for a trusted software execution environment that prevents software executing outside the memory region from having access to software and data within the memory region, for execution of a workload running on a graphics processing unit, execute a command that takes a pointer to a device thread control structure belonging to an enclave-device-module, enter the enclave-device-module, and fetch commands from the memory inside the enclave-device-module.

22. The apparatus of claim 21, said processor to mark the structure as busy when the protected memory region is entered.

23. The apparatus of claim 21, said processor to make a synchronous entry to the protected memory region.

24. The apparatus of claim 21, said processor to make an asynchronous entry to the protected memory region.

25. The apparatus of claim 21, said processor to make a synchronous entry on the first entry to the protected memory region and using an asynchronous entry thereafter.

26. The apparatus of claim 25, said processor to use a flag to indicate whether to enter synchronously or asynchronously.

27. The apparatus of claim 21, said processor to exit from the protected memory region using a command executed inside the memory.

28. The apparatus of claim 21, said processor to use a memory write to a memory management input output device register in order to enter the protected memory region.

* * * * *